(12) United States Patent
Natarajan et al.

(10) Patent No.: US 12,517,657 B1
(45) Date of Patent: Jan. 6, 2026

(54) IMPLEMENTING SPARSE DISTRIBUTED MEMORY

(71) Applicant: Hewlett Packard Enterprise Development LP, Spring, TX (US)

(72) Inventors: Aishwarya Natarajan, Milpitas, CA (US); Giacomo Pedretti, Verbania (IT); Suparna Bhattacharya, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/885,881

(22) Filed: Sep. 16, 2024

(30) Foreign Application Priority Data

Jul. 4, 2024 (IN) .............................. 202411051418

(51) Int. Cl.
*G06F 12/00* (2006.01)
*G06F 3/06* (2006.01)

(52) U.S. Cl.
CPC .......... *G06F 3/0611* (2013.01); *G06F 3/0659* (2013.01); *G06F 3/067* (2013.01)

(58) Field of Classification Search
CPC .............. G06F 12/0207; G06F 12/0215; G06F 12/1475; G06F 18/2414; G06F 8/41
See application file for complete search history.

(56) References Cited

PUBLICATIONS

Hu et al., "Dot-Product Engine for Neuromorphic Computing: Programming 1T1M Crossbar to Accelerate Matrix-Vector Multiplication", Hewlett Packard Labs, 2016, 7 pages.
Lindell et al., "Configurable sparse distributed memory hardware implementation", IEEE International Symposium on Circuits and Systems (ISCAS), Jun. 11-14, 1991, 4 pages.
Ni et al., "Ferroelectric ternary content-addressable memory for one-shot learning", vol. 2 | Nov. 2019, pp. 521-529.
Pentti Kanerva ,"Sparse Distributed Memory", available online at <https://mitpress.mit.edu/9780262514699/sparse-distributed-memory/>, Jan. 1, 2003, 4 pages.

*Primary Examiner* — Yong J Choe
(74) *Attorney, Agent, or Firm* — Hewlett Packard Enterprise Patent Department (57) ABSTRACT

A device for implementing sparse distributed memory may include first circuitry having a plurality of cells arranged in first subsets. The first circuitry may be configured to receive a first input vector for a write operation and calculate a similarity between the first subsets of the first circuitry and the first input vector. The device may include second circuitry coupled to the first circuitry and configured to output a first activation signal. The device may include third circuitry coupled to the second circuitry and having cells arranged in second subsets. The third circuitry may be configured to receive the first activation signal and selectively activate one or more first selected subsets of the second subsets in response to the first activation signal by incrementing or decrementing corresponding values of the cells of the one or more first selected subsets based on the first input vector.

20 Claims, 7 Drawing Sheets

IMPLEMENTING SPARSE DISTRIBUTED MEMORY

BACKGROUND

Computer systems store data in a variety of ways. For example, computer systems may organize data in one or more data structures for storage. Data structures can include collections of data, such as arrays, lists, sets, maps, trees, or other suitable collections of data. Each data structure may organize subsets of data in an associated manner. For example, a data structure may organize subsets of data in an array or matrix may include rows and columns. In an example in which a data structure is an array or matrix, the array or matrix may include rows and columns in certain implementations.

BRIEF DESCRIPTION OF THE DRAWINGS

For a more complete understanding of this disclosure, and advantages thereof, reference is now made to the following descriptions taken in conjunction with the accompanying drawings, in which.

DESCRIPTION

Sparse distributed memory (SDM) is a type of associative memory that maps a large space of dimensional (and potentially high-dimensional) binary vectors to a smaller set of physical locations that are distributed, potentially randomly. SDM may facilitate storing a large number of vectors in a smaller memory due to a distributed representation of the SDM architecture. When desired information is searched, SDM can be used to identify the relatively closest matches based on similarity (of the search parameters and information stored in the memory) rather than basing such search on the exact match (though exact matches may occur).

As an example use case, SDMs can be used to extract data from noisy images. In some implementations, SDM can be used as a generalization of other memory structures, such as Hopfield Networks. For example, SDMs can be used to generalize an attention mechanism that is used in large language models. During implementation of the SDM architecture, directly translating SDM to so-called conventional hardware-based architectures based on adders, decoders, counters, and digital logic may cause some challenges. For example, relatively large-size circuitry may be appropriate, and such circuitry may consume relatively high amounts of power. As another example, the SDM architecture may suffer from limited throughput capacity and/or latency bottlenecks.

Certain implementations of this disclosure provide a memristive-based implementation of SDMs, through a system based on in-memory computing structures such as a dot product engine (DPE) and a content addressable memory (CAM) that can compute information directly in memory. In some implementations, a CAM-based architecture can be coupled with the DPE and integrated with various peripherals to implement SDM operations. Even though memristors are used in some implementations, other programmable resistors can be utilized to implement the SDM architecture.

In some implementations, the CAM is used to determine a similarity between stored data and input data. For example, a CAM may return Hamming distances to detect a similarity between the stored data and input data. As a more particular example, the CAM may execute computation of Hamming distances in one cycle to calculate similarity between the input data (e.g., which may be in the form of a data input vector) and each of the vectors stored in the corresponding CAM rows. The DPE can be used to store multiple copies of the input data to be written into SDM, based on the active set of locations obtained from the CAM portion of the circuitry. For example, the DPE can be used instead of counter and adder arrays.

Using the CAM circuitry, a data input vector (or an address register) can be compared to the vector stored in the CAM. A match line in the CAM determines whether a match between search data and stored data in memory cells occurs. The match line activates when a match is found, indicating where the matched data is stored. Operating in parallel, the match line may provide fast content-based searches across multiple cells simultaneously, potentially enhancing high-speed access capabilities. Outputs of a match line of the CAM can be recorded in one cycle to obtain Hamming distances. A sense amplifier may receive input signals from the CAM and send activation signals to the DPE. The sense amplifier can be set to detect the Hamming distance or another measure of similarity. For example, mismatches can correspond to Hamming distances that are greater than a given radius between two vectors (e.g., the vector of the address input register and the location address in the address matrix). In some implementations, the vectors are Boolean vectors. The rows of the DPE for which the Hamming distance is within the Hamming radius of an activation threshold may be selected and such locations may be set as active.

In some implementations, the SDM device may include programmable elements of the DPE arrays configured to implement the SDM architecture. The programmable elements may be memristors or other types of programmable resistors. The SDM device may be configured to perform in-memory computing operations to reduce or eliminate data movement between data and storage units. The SDM device may be configured to perform bitwise sum calculations along the columns of the DPE array.

During a storage (or write) operation, a data input vector may be compared with stored vectors (e.g., address identifiers) in the CAM array. The CAM rows may be selected based on a similarity between the data input vector and the vectors stored in each CAM row. The selected rows may be activated and provide signals to a sense amplifier, and the sense amplifier may provide activation signals to the DPE rows corresponding to the CAM rows.

The values of the activated rows of the DPE array can be incremented (or decremented) based on the storage input data. For example, during a storage operation, when the corresponding rows of the DPE matrix are activated, the values, e.g., conductances, of the cells on the activated rows of the DPE matrix may be incremented if the binary values of the address register (or the data input vector) are ones (1s) and decremented if such binary values are zeroes (0s). Such DPE operation utilizes a programmed matrix of conductances that are increased (or decreased) by an appropriate amount (e.g., one step unit) that depends on the resolution (or precision) of the conductance to which the memristor can be tuned. As a result of this DPE operation, multiple copies of the data can be stored because multiple DPE rows may be activated, with each activated DPE row corresponding to the respective activated CAM row.

A read operation may include comparing a search vector with stored vectors in the CAM array and selecting the CAM rows based on a similarity between the search vector and the vectors stored in each CAM row. The DPE rows that correspond to the selected CAM rows may be activated. The DPE can also provide a bitwise sum of the activated cells along the columns of the array.

During a read operation, the pooled bitwise sums obtained from the DPE may be compared against a threshold providing a value of one (1) if the column-wise sum is greater than zero (0). Otherwise the value of zero (0) is assigned to the obtained column-wise sum. The resulting data of ones and zeros may be output as the result of the read operation. In some implementations, a second sense amplifier (e.g., a comparator) and/or other suitable components may be used to output zeroes and ones based on a threshold for the bitwise sums. In some implementations, the DPE array output zeroes and ones based on a threshold for the bitwise sums.

Certain implementations of this disclosure may provide a compact and low-latency implementation of an SDM architecture. For example, the compute-in-memory architecture for SDM implemented with CAM and DPE may reduce or eliminate certain processing bottlenecks (e.g., the so-called Von Neumann bottleneck) by reducing or eliminating data movement between data and storage units, which is a relatively resource-intensive operation. Certain implementations may achieve a higher level of parallelism by computing Hamming distances in one cycle using the CAM architecture. In certain implementations, a one cycle calculation might be achieved for bitwise sum through the columns of the DPE. In some implementations, a memory read latency can be independent of multiple active locations due to simultaneous accessibility and accumulation provided by the DPE.

Certain implementations of this disclosure may use analog components. For example, in some implementations, input and outputs can be digital without relying on analog-to-digital (ADC) and/or digital-to-analog (DAC) conversions, which may reduce or eliminate bottlenecks for analog computing that otherwise may be caused by such components.

Figure 1:
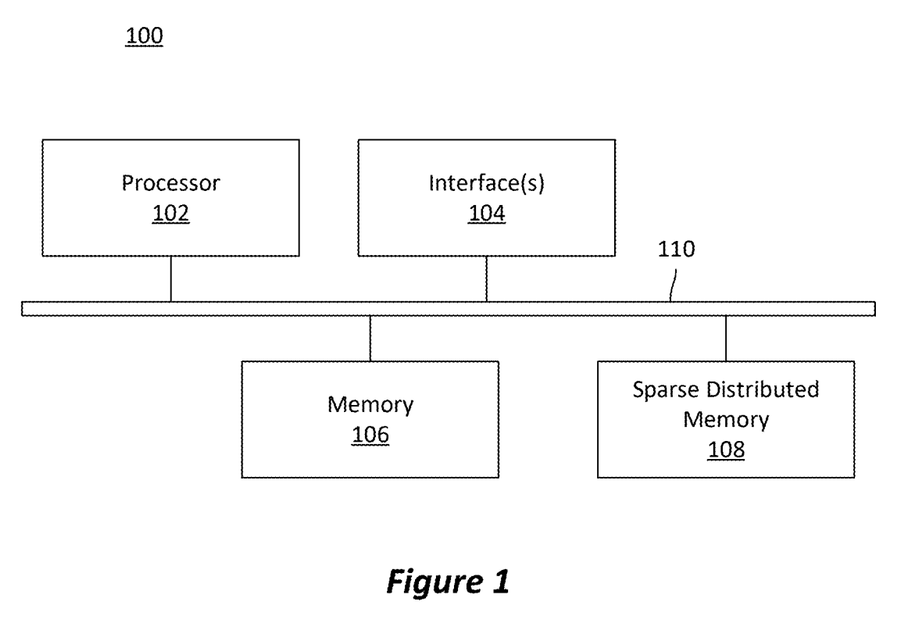
FIG. 1 illustrates an example computing system for implementing sparse distributed memory (SDM), according to some implementations.

FIG. 1 illustrates an example computing system 100 for implementing sparse distributed memory (SDM), according to some implementations. Computing system 100 can be used to process storing or reading data, according to some implementations. The computing system 100 may be implemented in one or more electronic devices. Examples of electronic devices include servers, desktop computers, laptop computers, mobile devices, gaming systems, and/or other suitable electronic devices, alone or in combination.

The computing system 100 may be utilized in any data processing scenario, including stand-alone hardware, mobile applications, or combinations thereof. Further, the computing system 100 may be used in a computing network, such as a public cloud network, a private cloud network, a hybrid cloud network, other forms of networks, or combinations thereof. In one example, computing system 100 provides operations as a service over a network by, for example, a third party. The computing system 100 may be implemented on one or more hardware platforms in which the modules in the system can be executed on one or more platforms. Such modules can run on various forms of cloud technologies and hybrid cloud technologies or be offered as a Software-as-a-Service that can be implemented on or off a cloud.

Computing system 100 may include various components that may be implemented using any suitable combination of hardware, firmware, and software. These components may include a processor 102, one or more interface(s) 104, a memory 106, and a sparse distributed memory (SDM) 108. Although referred to in the singular for simplicity, computer system 100 may include any suitable number of these components. The components may be interconnected through a number of buses and/or network connections. In one example, the processor 102, the interface(s) 104, the memory 106, and the SDM 108 may be communicatively coupled via a bus 110.

The processor 102 retrieves executable code from the memory 106 and executes the executable code. The executable code may, when executed by the processor 102, cause the processor 102 to implement any functionality described herein. The processor 102 may be a microprocessor, an application-specific integrated circuit, a microcontroller, or the like.

The interface(s) 104 may provide the processor 102 to interface with various other hardware components, external and internal to the computing system 100. For example, the interface(s) 104 may include interface(s) to input/output devices, such as, for example, a display device, a mouse, a keyboard, etc. Additionally or alternatively, the interface(s) 104 may include interface(s) to an external storage device, or to a number of network devices, such as servers, switches, and routers, client devices, other types of computing devices, and combinations thereof.

The memory 106 may include various types of memory, including volatile and nonvolatile memory. For example, the memory 106 may include Random-Access Memory (RAM), Read-Only Memory (ROM), a Hard Disk Drive (HDD), and/or the like. Different types of memory may be used for different data storage needs. For example, in certain examples the processor 102 may boot from ROM, maintain nonvolatile storage in an HDD, execute program code stored in RAM, and store data under processing in RAM. The memory 106 may include a non-transitory computer readable medium that stores instructions for execution by the processor 102. One or more modules within the computing system 100 may be partially or wholly embodied as software and/or hardware for performing any functionality described herein. The memory 106 may include a general-purpose memory used to store data for the processor 102.

According to some implementations of this disclosure, the SDM 108 may accelerate processing of read and write operations. In some implementations, the SDM 108 can be a memory device that can process associative memory tasks with improved efficiency and speed. The processor 102 may utilize the SDM 108 to perform complex computations more efficiently. In some implementations, the processor 102 may send instructions to the SDM 108 to perform read and write operations. The SDM 108, can process the instructions received from the processor and output the results to the processor 102.

The memory 106 may store the data structures and the operational code that the processor 102 executes. When the processor 102 operates with large sets of e.g., high-dimensional data, it may use the SDM 108 to store and retrieve these data sets efficiently, though of course SDM 108 may be used in any suitable circumstances. During operations where rapid access to associative memory is appropriate, such as graph processing or pattern recognition, the SDM 108 can provide quick retrieval of related data points that which are used by the processor 102 and potentially stored in or retrieved from the memory 106.

The SDM 108 may be different than the processor 102 and the memory 106, and specifically, may be different than cache(s) of the processor 102 and the memory 106. Additionally, the architecture of the SDM 108 may be different than that of the memory 106. In some implementations, the SDM 108 includes a CAM array and a DPE array.

The computing system 100 may be configured to perform a variety of computational tasks, including data analysis, machine learning, and/or other suitable computational tasks. The computing system 100 may utilize the SDM 108 to improve its data processing capabilities, particularly in applications that benefit from associative memory functions, such as neural networks.

The processor 102 may execute instructions and process data stored in the memory 106. The processor 102 may be configured to perform computations, including updating the CAM cells, performing calculations of the DPE cells based on the data input vector and the search vector. The processor 102 may interact with the SDM 108 to accelerate search processing tasks. For example, the processor 102 may use the SDM 108 to quickly retrieve memory addresses in the memory 106. By leveraging the SDM 108, the processor 102 may efficiently perform lookup operations, thereby reducing the computational overhead associated with accessing and processing data structures.

Figure 2:
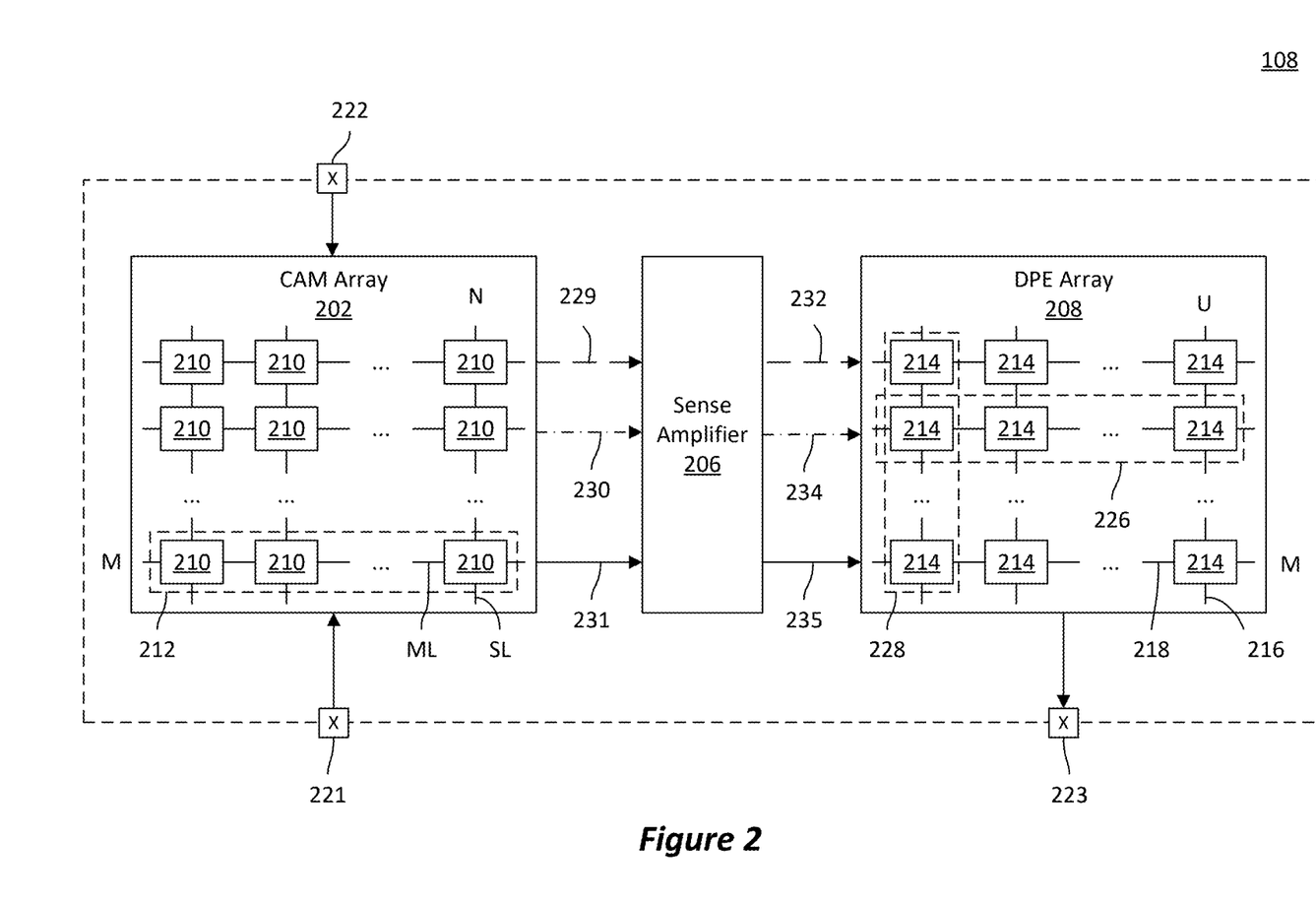
FIG. 2 illustrates an example SDM, according to some implementations.

FIG. 2 illustrates an example implementation of SDM 108 of FIG. 1, according to some implementations. In the illustrated example, the SDM 108 is implemented using a CAM array 202 and a DPE array 208. The SDM 108 may include one or more sense amplifiers 206.

Additionally, the SDM 108 may include peripheral circuits for operating the various components of the SDM 108. Example peripheral circuits include read/write circuits for the CAM array 202, read/write circuits for the DPE array 208, a clock circuit for temporalizing operations in the SDM 108, a control circuit for controlling the components of SDM 108, and/or other suitable peripheral circuits.

The CAM array 202 includes CAM cells 210, search lines SL, and match lines ML. The CAM cells 210 can arranged subsets (e.g., in rows and columns). For example, the CAM array 202 may have M rows and N columns. The search lines SL are arranged along and correspond to the columns of the CAM cells 210. The match lines ML are arranged along and correspond to the rows of the CAM cells 210. A row of CAM cells 210 may be referred to as a CAM row 212. Each CAM row 212 stores a vector that includes multiple values (stored in the CAM cells 210 of the CAM row 212). The CAM cells 210 may be ternary CAM (TCAM) cells. A TCAM cell is adapted to store a low value (e.g., a binary 0), a high value (e.g., a binary 1), or a wildcard value. Examples of TCAM cells include SRAM-based TCAM cells, ReRAM-based TCAM cells, memristor-based TCAM cells, and/or other suitable TCAM cells.

In some implementations, a "cell" may refer to an individual storage unit within the memory architecture. As an example, a CAM cell (e.g., the CAM cell 210) may be one unit within the Content Addressable Memory (CAM) array 202 that may store a bit or element of a vector. In some implementations, a "subset" may refer to a group of cells, which together may store a vector. As an example, a CAM row (e.g., the CAM row 212) may be a subset of the CAM array 202 that may include multiple CAM cells 210, each holding a bit of the vector stored in the CAM row 212.

Figure 3A:
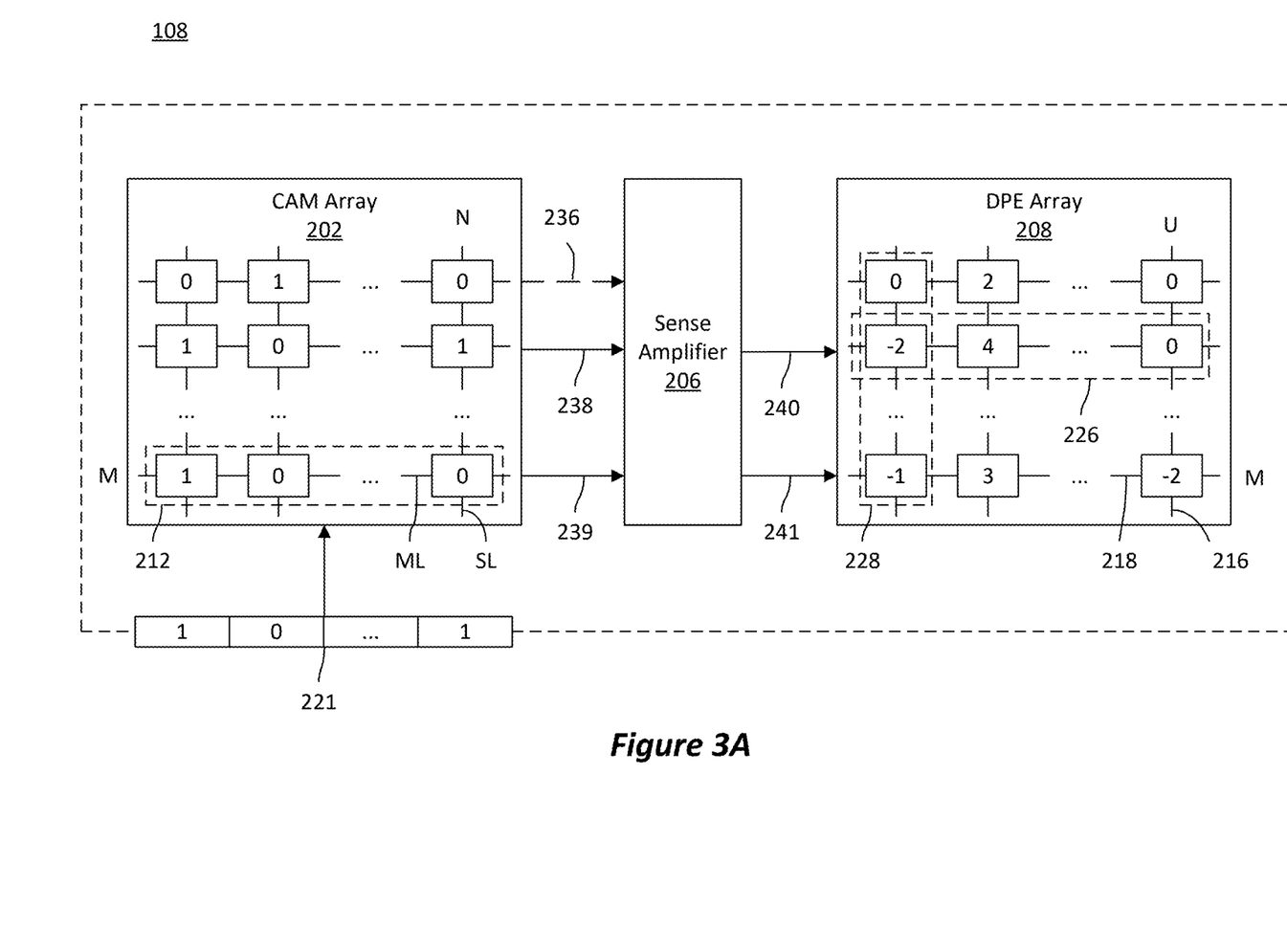
FIGS. 3A-3C illustrate example operation of an SDM during certain types of operations, according to some implementations.

While FIGS. 3A-3C are described in greater detail below, briefly referring now to FIG. 3A, an example implementation of the SDM 108 performing the storage (or the write) operation is shown. During a write operation, a write vector of values (e.g., voltages) is applied to the CAM cells 210 of a CAM row 212, via bit lines. Each CAM cell 210 of the CAM row 212 may be set to a low value, a high value, or (optionally) a wildcard value, based on a corresponding value of the initial write vector that may be a random input vector. In some implementations, the initial write vector may be a separate vector from the data input vector 221. Thus, each CAM row 212 has a vector of values stored therein.

Figure 3B:
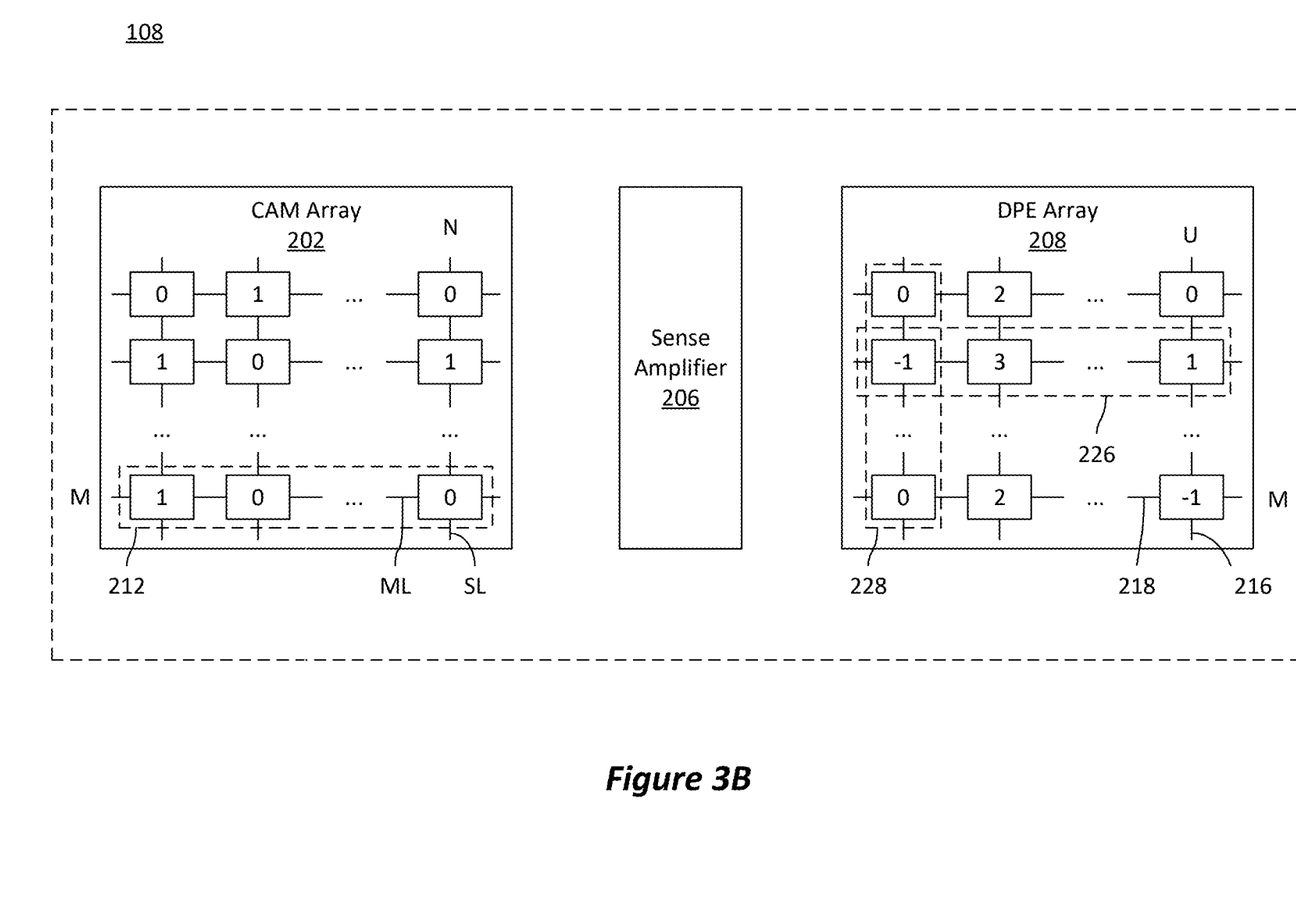
Figure 3C:
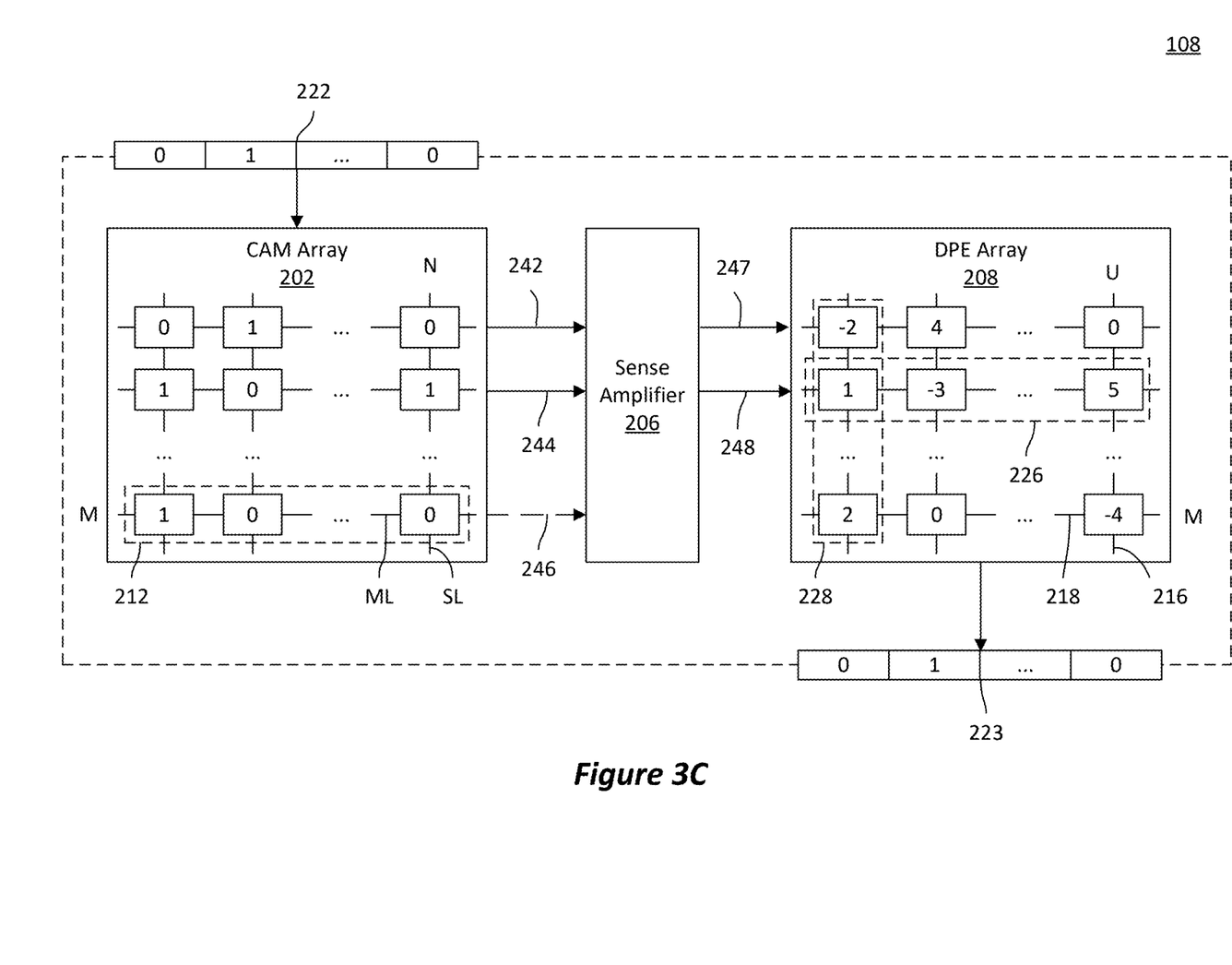

Briefly referring now to FIG. 3C, an example implementation of the SDM 108 performing the read operation is shown. During a read operation, a read vector of values (e.g., voltages) is applied to the CAM rows 212, via the search lines SL. Each CAM cell 210 of a CAM row 212 compares its stored value to a corresponding value of the read vector (e.g., the search vector 222). The CAM rows 212 having stored values that match the corresponding values of the read vector activate their corresponding match lines ML (for example, a first and second rows of the CAM array 202). In other words, during a read operation, the CAM array 202 receives a read vector, searches for the read vector in the CAM rows 212, and activates the match lines ML of the CAM rows 212 that store the read vector. The match lines ML of the CAM rows 212 that store a different vector than the read vector are deactivated (for example, the last row of the CAM array 202 is deactivated).

As subsequently described below in greater detail, identifiers for hard addresses (or locations) are stored in the CAM rows 212 of the CAM array 202. For example, an identifier may be a vector of values stored in the CAM cell 210 of a CAM row 212. The CAM array 202 is configured to receive (on the search lines SL) an identifier of locations or addresses. Additionally, the CAM array 202 is configured to search for the received identifier in the CAM rows 212, and activate such match lines ML that correspond to the CAM rows 212, which store the identifier, e.g., each of the CAM rows 212 that stores the identifier of the address or location.

In some cases, the CAM array 202 may be configured to execute computation of similarities between the data input vector 221 and each of the vectors stored in the corresponding CAM rows 212. In some implementations, similarity between these two vectors can be represented by a Hamming distance, Euclidean distance, Chebyshev distance, cosine distance, Mahalanobis distance, Kullback-Leibler divergence, Spearman rank correlation distance, and/or other suitable representations of similarity.

As an example, the Hamming distance is a metric used to determine the number of differing positions between two Boolean vectors, such as the vector from an address input register and a corresponding address in an address matrix, where the address matrix can correspond to the CAM array 202. In some implementations, the distance computation between the data input vector 221 and the vector stored in the CAM row 212 can be measured using the Hamming distance. For example, in some implementations, the Hamming distance may be calculated by comparing each element of the data input vector 221 with the corresponding element in the CAM cell 210 of the CAM row 212.

As a particular example, the Hamming distance may be used to count the number of positions at which the corresponding CAM cells 210 and elements of the data input vector 221 differ. The total number of mismatches across all corresponding CAM cells 210 and elements may provide the Hamming distance for the CAM row 212. The sense amplifier 206 may use this distance to determine which CAM rows 212 are sufficiently similar to the input vector to provide activation for the subsequent memory operation.

The Hamming distance can be utilized to activate locations within a predefined Hamming radius. The calculation of Hamming distance in CAM arrays 202 can involve one search operation that identifies the number of mismatches by observing the discharge rates on the match lines. These discharge rates vary depending on the similarity between the input and stored vectors, with higher rates of discharge corresponding to a greater number of mismatched bits. In some implementations, the match line over time exhibits a transient behavior, where an increase in mismatched bits at least partially causes an accelerated discharge due to an increase in match line discharge currents. In some implementations, the voltage at the match line can be substantially linearly dependent on a number of mismatched bits.

Returning to FIG. 2, the sense amplifier 206 may be configured to receive signals 229, 230, 231 from the CAM array 202, where each signal 229, 230, 231 represents a similarity between values stored in the CAM rows 212 and the data input vector 221. The similarity may have a first threshold. For example, the first threshold using Hamming distance between two vectors can be 447, meaning that the number of mismatched bits is 447. The sense amplifier 206 may output a first activation signal 232, 234, 235 based on the first threshold. For example, if the Hamming distance of the CAM row is lower than the Hamming distance of 447 (e.g., the two compared vectors are within the Hamming radius from each other), then the sense amplifier 206 provides the activation signal 232, 234, 235 to the corresponding rows of the DPE array 208.

The DPE array 208 includes a plurality of input electrodes 218, a plurality of output electrodes, and plurality of programmable elements 214. DPE array 208 also may be referred to as a programmable crossbar array. The input electrodes 218 are arranged in subsets, e.g., in DPE rows 226, the output electrodes 216 are arranged in subsets, e.g., in DPE columns 228. Each programmable element 214 is positioned at a crosspoint or junction of an input electrode 218 and an output electrode 216. As input, the DPE array 208 takes a vector of analog signals (on the input electrodes 218).

In some implementations, the programmable elements 214 may be circuit elements that may have programmable conductances. The programmable elements 214 are non-volatile analog devices, which may be adapted to store multiple bits of data. An example of a programmable element is a memristor, which includes a dielectric layer (e.g., an oxide layer) between two metal layers. When the programmable elements 214 are memristors, the DPE array 208 is a memristor array. Other examples of programmable elements include multi-bit flash memory cells, resistive random-access memory (ReRAM) cells, phase-change random-access memory (PCRAM) cells, magnetoresistive random-access memory (MRAM) cells, electrochemical random-access memory (ECRAM) cells, and/or other suitable programmable elements.

The DPE array 208 may also include other peripheral circuitry (not separately illustrated) associated with the DPE array 208 when used as a storage device. For example, the DPE array 208 may include drivers connected to the input electrodes 218. An address decoder can be used to select an input electrode 218 and activate a driver corresponding to the selected input electrode 218. The driver for a selected input electrode 218 can drive a corresponding input electrode 218 with different voltages corresponding to a vector-matrix multiplication or the process of setting resistance values within the programmable elements 214 of the DPE array 208. Similar driver and decoder circuitry may be included for the output electrodes 216. Control circuitry may also be used to control application of voltages at the inputs of the DPE array 208. Input signals to the input electrodes 218 and the output electrodes 216 can be analog signals. The peripheral circuitry above described can be fabricated using semiconductor processing techniques in the same integrated structure or semiconductor die as the DPE array 208.

The DPE array 208 includes M input electrodes 218 and U output electrodes 216. As described in further detail below, there are at least two operations that occur during operation of the DPE array 208. The first operation is to program the programmable elements 214 in the DPE array 208 so as to map the mathematic values in an M×U matrix to the programmable elements 214 for DPE array 208. The second operation is the dot product or vector-matrix multiplication operation. In this operation, input voltages are applied to the input electrodes 218 and output currents are obtained from the output electrodes 216, corresponding to the result of multiplying an M×1 vector with the M×U matrixes. The input voltages are below the threshold of the programming voltage of the programmable elements 214 so the resistance values of the programmable elements in the DPE array 208 are not changed during the vector-matrix multiplication operation.

The DPE array 208 may be programmed to store the M×U matrixes by modifying the conductances of the programmable elements 214. The conductances of the programmable elements 214 are values corresponding to the M×U matrixes. The conductances of the programmable elements 214 may be modified by imposing a voltage across the programmable elements 214 using the input electrode 218, the output electrodes 216, and corresponding voltage drivers. The voltage difference imposed across a programmable element 214 generally determines the resulting conductance of that programmable element 214. The programming process may be performed row-by-row.

A vector-matrix multiplication may be executed through the DPE array 208 by applying a set of voltages simultaneously along the input electrodes 218 of the DPE array 208 and collecting the currents through the output electrodes 216. The signal generated on an output electrode 216 is weighted by the corresponding conductance of the programmable elements 214 at the crosspoints of the output electrode 216 with the input electrodes 218, and that weighted summation is reflected in the current at the output electrode 216. Thus, the relationship between the voltages at the input electrodes 218 and the currents at the output electrodes 216 is represented by a vector-matrix multiplication of the input vector (e.g., the search vector 222) with the M×U matrix determined by the conductances of the programmable elements 214 for DPE array 208.

In some implementations, the programmable elements 214 of the DPE array 208 may be configured as counters represented by cells arranged in DPE rows 226, where each DPE row 226 may represent a plurality of counters. During a write operation, the DPE array 208 may receive the first activation signals 240, 241 (FIG. 3A) from the sense amplifier 206 and activate one or more DPE rows 226 of the DPE array 208 (e.g., a second and last DPE rows 226 of the DPE array 208).

The DPE array 208 may be configured to receive a data input vector 221 and to store multiple copies of the data input vector 221 based on the active set of locations obtained from the CAM array 202. The DPE array 208 may be configured to increment or decrement the values, e.g., the conductances, of the activated rows (e.g., a second and last DPE rows 226 of the DPE array 208) based on the binary values of the data input vector 221.

FIGS. 3A-3C illustrate example operation of an SDM (e.g., SDM 108) during certain types of operations, according to some implementations. In particular, FIG. 3A illustrates an example of SDM 108 performing a write operation, according to some implementations; FIG. 3B illustrates an example of SDM 108 following execution of a write operation, according to some implementations; and FIG. 3C illustrates an example of SDM 108 performing a read operation, according to some implementations. Each of FIGS. 3A-3C is described in greater detail below.

As described above, FIG. 3A illustrates an of SDM 108 performing a write operation, according to some implementations. In some implementations of the computing system 100, the data input vector 221 can be stored as an address register within the CAM array 202. Such storage (or write) operation can include the CAM array 202 being configured by, for example, random or pseudo-random values corresponding to the conductance states of the memristors or programmable resistors within each CAM cell 210. As an example, each CAM row 212 in the CAM array 202 may store a random vector a pseudo-random vector, and/or other suitable vectors. In some implementations, each CAM row 212 may store separate random vectors. In some implementations, the data input vector 221 can then be compared to the initial random vectors stored within the CAM array 202. The CAM array 202 is configured to perform a parallel comparison between the data input vector 221 and all the stored vectors (e.g., random vectors) within the CAM rows 212.

In some implementations, the CAM array 202 executes comparison between the data input vector 221 and each of the stored random vectors to determine the similarity between the data input vector 221 and the stored random vectors. As described herein, such similarity can be measured by, e.g., the Hamming distance, which is calculated by counting the number of positions at which the corresponding values are different, e.g., where the mismatch occurs at the match line.

Once the Hamming distances are computed, the match lines ML of the CAM array 202 provide the results of these comparisons to the sense amplifier 206 via, e.g., signals 236, 238, 239. The sense amplifier 206 is configured to evaluate the Hamming distances against a first threshold, which represents the Hamming radius of activation. If the Hamming distance for a particular CAM row 212 is less than or equal to the first threshold (e.g., the Hamming distances corresponding to the second and last CAM rows 212), it indicates a sufficient level of similarity between the data input vector 221 and the vector stored in that CAM row 212.

The sense amplifier 206 then generates first activation signals 240, 241 for each CAM row 212 that meets the criteria of having a Hamming distance within the Hamming radius. The first activation signal indicates that the corresponding CAM row 212 is considered active for the write operation. For example, the selected second and last CAM rows 212 represent two of these activated rows within the CAM array 202.

When the relevant rows within the CAM array 202 are activated, the sense amplifier 206 can provide the activation signals 240, 241 to the corresponding rows within the DPE array 208. During the write operation, the values of the activated rows of the DPE array 208, represented by the selected second and last DPE rows 226, are incremented or decremented based on the write input data of the data input vector 221. Such incrementing or decrementing is achieved through a programmed matrix of conductances within the programmable elements 214, which can be memristors in some implementations. The conductances of these memristors can be, for example, increased or decreased by one step unit, which is dependent on the resolution of the conductance that the memristors can be tuned to.

Turning to FIG. 3B, FIG. 3B illustrates an example of SDM 108 after the write operation is performed according to FIG. 3A, according to some implementations. For example, values of the cells representing the counters of the activated second and last rows were incremented and decremented as described below. The first value of the data input vector 221 is 1, therefore the values of the first cells representing the first counters of the activated second and last rows (which before the write operation were −2 and −1, respectively (See FIG. 3A)) are incremented by 1. The results of incrementing are recorded in the respective first cells representing the first counters of the second and the last rows (−1 and 0, respectively (See FIG. 3B)). The second value of the data input vector 221 is 0, therefore second cells representing the second counters of the activated second and last rows (which before the write operation were 4 and 3, respectively (See FIG. 3A)) are decremented by 1. The results of decrementing are recorded in the respective second cells representing the second counters of the second and the last rows (3 and 2, respectively (See FIG. 3B)). Such incrementing and decrementing are performed for all respective active rows based on whether the corresponding value of the data input vector 221 is 1 or 0. In other words, the data of the data input vector 221 modifies the various activated rows of the DPE array 208. As a result, multiple vectors of the data corresponding to the data input vectors 221 can be stored within the DPE array 208.

Turning to FIG. 3C, FIG. 3C illustrates an example of SDM 108 performing a read operation, according to some implementations. During a read operation, the search vector 222 is input into the SDM 108, according to some implementations. The search vector 222 can be compared to each vector stored in the respective CAM row 212 and a similarity (e.g., Hamming distance) between the search vector and each CAM row 212 is calculated. In some implementations, the similarity measure, e.g., the Hamming distance, may be determined by summing the differences between each element of the search vector 222 and the corresponding element in the CAM cell 210. In some implementations, ff the number of differing bits is within a second threshold, the CAM row 212 is considered a match to the search vector 222. Based on the second threshold for the Hamming distance, the sense amplifier 206 activates the DPE rows 226 corresponding to the CAM rows 212 (e.g. such CAM rows 212, which Hamming distances satisfy the second threshold criterion). In some implementations, the second threshold and the first threshold described above (which is used during the write operation) can be the same. In some implementations, the second threshold can be greater or less than the first threshold.

During the read operation, the DPE array 208 outputs a column-wise sum (e.g., a bitwise sum) along the columns of the DPE array 208. One of such columns is represented by the DPE column 228. The bitwise sum is a result of summing the values of the activated cells along the columns of the DPE array 208. Furthermore, during the read operation, the pooled bitwise sums obtained from the DPE array 208 are compared against a third threshold, e.g., a sum that may be equal to zero (0). As an example, if the sum of the DPE column 228 having selective cells of the activated DPE rows 226 is greater than zero, a value of one (1) is assigned to a corresponding value in the output vector 223. Otherwise, a value of zero (0) is assigned to the obtained columnwise sum. In some implementations, the output electrodes 216 are utilized to read out such resulting data of ones and zeros, providing an efficient means of retrieving data from the SDM 108.

In some implementations, multiple output vectors 223 may be provided based on the second threshold of similarity between the search vector 222 and the addresses stored in the CAM rows 212, where such similarities meet the match criterion of the second threshold.

In some implementations, the DPE array 208 can output zeroes (0s) and ones (1s) based on a threshold for the bitwise sums. In some implementations, a second sense amplifier, a comparator, and/or other suitable component may be used to output zeroes (0s) and ones (1s) based on the threshold for the bitwise sums. As an example, the comparator circuit for each column of the DPE array 208 can compare the bitwise sum to the threshold and output a binary value based on the comparison.

As described above, the activation of the CAM cells 210 during the write and read operations is determined by the similarity calculations between the data input vectors 221 and the search vectors 222. In some implementations, during the write operation, the CAM array 202 calculates similarities between a first input vector (e.g., the data input vector 221) and each of the CAM-cell subsets (e.g., the CAM rows 212). In some implementations, the similarities are calculated according to the threshold. The sense amplifier 206 outputs a first activation signal 238, 239 based on such similarities. The write operation selectively activates the CAM-cell subsets (e.g., the CAM rows 212) that are similar to the first input vector (e.g., the data input vector 221). Thus, the data input vector 221 is stored in the CAM cells 210 having similarities that match the threshold criterion.

During the read operation, the CAM array 202 calculates similarities between a second input vector (e.g., the search vector 222) and the CAM-cell subsets (e.g., the CAM rows 212). The sense amplifier 206 outputs a second activation signal 247, 248 based on such similarities. The second activation signal 247, 248 is based on the CAM activation signal 242, 244 output by the CAM-cell subsets that are similar to the second input vector (e.g., the search vector 222). The activated CAM cells 210 for the write operations can be distinct from the activated CAM cells 210 during the read operations, they can be the same, or they may overlap at least partially. The specific CAM cells 210 that are activated during these operations depend on the input vectors (e.g., the data input vector 221 and the search vector 222) and the similarity thresholds applied during these operations.

As described herein, the activation of the DPE cells 214 during the write and read operations is controlled by the activation signals 240, 241, 247, 248 received from the sense amplifier 206. In some implementations, during the write operation, the DPE array 208 selectively activates first selected DPE-cell subsets (e.g., the DPE rows 226) according to the first activation signal 240, 241, which corresponds to the similarity between the first input vector (e.g., the data input vector 221) and the CAM-cell subsets. The values of the DPE cells 214 in the activated DPE-cell subsets are decremented or incremented based on the first input vector (e.g., the data input vector 221).

For the read operation, the DPE array 208 selectively activates second selected DPE-cell subsets according to the second activation signal 247, 248, which corresponds to the similarity between the second input vector (e.g., the search vector 222) and the CAM-cell subsets (e.g., the CAM rows 212). The DPE array 208 then calculates and outputs sums determined from the activated DPE-cell subsets. The activated DPE cells 214 for the write operations can be distinct from the DPE cells 214 activated during the read operations, they can be the same, or they may overlap at least partially. The overlap or distinction between the activated DPE cells 214 for the write and read operations is a function of the activation signals 240, 241, 247, 248 derived from the similarities calculated by the CAM array 202.

In some implementations, the device may operate with digital inputs and outputs without requiring analog-to-digital or digital-to-analog conversions (ADC or DAC) because the CAM array 202 the DPE array 208 can perform their functions directly with analog signals as described herein. The write and read operations may provide the computing system 100 to perform associative memory functions of the SDM with improved efficiency and reduced latency.

The SDM 108 may be implemented in other manners than shown in FIGS. 2-3C. For example, multiple arrays of CAM and/or DPE may be utilized to store and read data. The SDM 108 may include additional features. In some implementations, the SDM 108 includes features used to perform additional matrix generation and multiplication operations.

As described above, when a search vector 222 is input into the SDM 108, the CAM array 202 calculates the similarity between the search vector 222 and the data input vectors 221 stored in each CAM row 212. If the similarity between the search vector 222 and the stored data input vector 221 meets a threshold, the corresponding CAM row 212 is activated. The activation of the CAM row 212 can be indicated by a signal, such as a match line signal, which is then communicated (via e.g., the signals 242, 244) to the sense amplifier 206.

The vector resulting from the CAM search operation can indicate the activated CAM rows 212. Such vector can be a binary vector having values corresponding to ones (1) for activation signals 242, 244 and zeros (0) for the non-activation signals 246. The sense amplifier 206, upon receiving the signals 242, 244, generates activation signals (e.g., the signals 247, 248) that are indicative of the activated CAM rows 212. The activation signals 247, 248 are then used to activate the corresponding rows 226 in the DPE array 208. The DPE array 208, which includes the cells 214 arranged in subsets, e.g., rows 226 and columns 228, performs vector-matrix multiplication and/or accumulation operations using the values stored in the cells 214 of the activated DPE rows 226.

The binary vector indicative of the activated CAM rows 212 can be used as an identification of the address for the data input vector 221, matching the search vector 222 to the data input vectors 221 stored in the CAM rows 212. In some implementations, the binary vector can be used as a diagnostic tool to analyze the memory response to specific inputs, assist in debugging the computing system 100, or provide insights into the activation patterns for visualization purposes. In learning systems, such activation information can be used to adjust the data input vectors 221 stored in the CAM array 202, thereby improving the accuracy and efficiency of search operations.

After the DPE array 208 completes the accumulation process, the resulting sums along the columns 228 of the DPE array 208 are compared against a threshold. Each column-wise sum represents the aggregate response of the memory to the search vector 222 along that DPE column 228. In some implementations, the process of comparing the column-wise sums to the threshold determines the output vector 223.

In some implementations, the disclosed computing system 100 can rank the activated CAM rows 212 based on how closely they match the search vector 222. Ranking can be achieved by comparing the output column-wise sums from the DPE array 208 with the activated rows 226 of the DPE array 208 that correspond to the activated CAM rows 212.

To rank the DPE rows 226, the SDM 108 may implement a ranking algorithm that evaluates the column-wise sums against the values in the activated cells 214 of the DPE array 208. A threshold within the ranking algorithm may be set to distinguish between the DPE cells 214 and the respective column-wise sums that indicate a strong match and the DPE cells 214 that do not indicate a strong match with the respective column-wise sums. The DPE rows 226 that are closer to a vector having the column-wise sums (e.g., according to the Hamming distance) are considered better matches. The ranking algorithm can assign a score or rank to each activated DPE row 226 based on the degree of similarity to the search vector 222, as reflected by the column-wise sums.

The ranked list of activated DPE rows 226 provides an indication of which rows 226 in the DPE array 208, and correspondingly which rows 212 in the CAM array 202, are the closest matches to the search vector 222. The higher ranked activated DPE rows 226 (and corresponding activated CAM rows 212) indicate a strong match or close similarity of the search vector 222 against the data input vector 221 stored in the CAM array 202 and/or the DPE array 208.

The identification and ranking of the activated CAM cells 210 and the activated DPE cells 214 based on their similarity to the search vector 222 (as reflected by the column-wise sums for the DPE array 208) can be used by users when insight into the associative memory processes in the SDM 108 is appropriate. In some implementations, such ranking can be used to retrieve the closest matches from the memory Such ranking can be used to show users the specific locations—e.g., rows 212 in the CAM array 202 and/or the corresponding rows 226 in the DPE array 208—where the data input vectors 221 closely matching the search vector 222 are stored. In some implementations, prioritize responses, or guide decision-making processes in applications where the SDM 108 is deployed.

Figure 4:
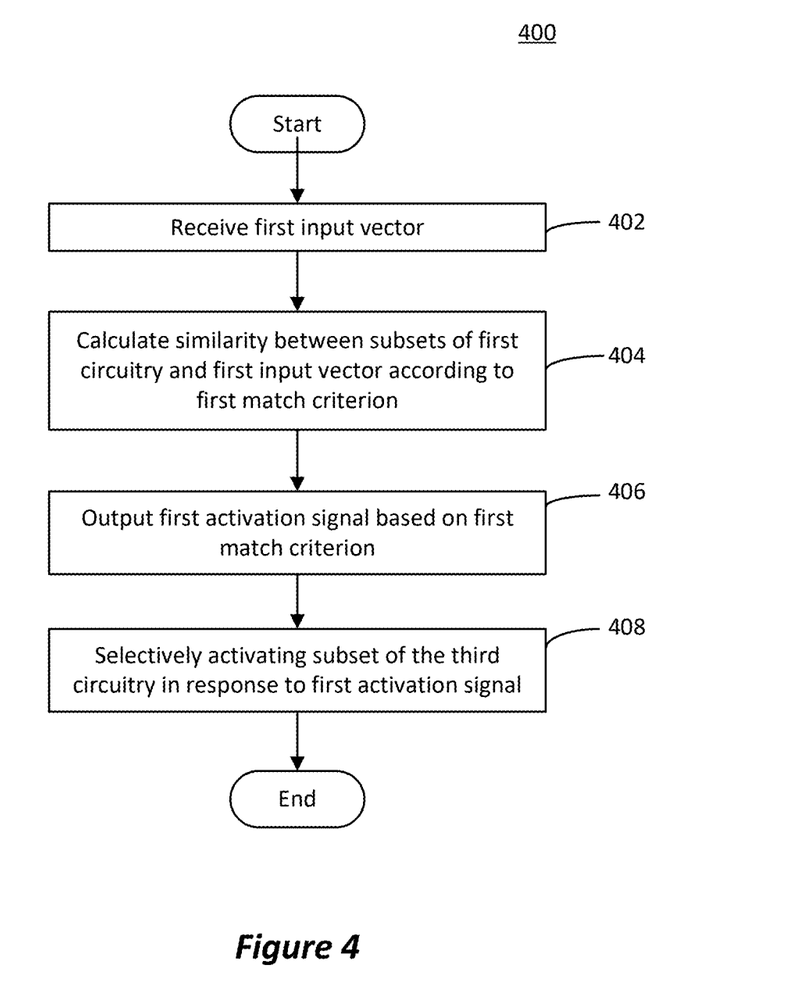
FIG. 4 illustrates an example method for implementing SDM, according to some implementations.

FIG. 4 illustrates an example method 400 for implementing SDM, according to some implementations. For example, method 400 may correspond to writing data to a device, such as the computing system 100. More specifically, method 400 may provide a storage method using SDM 108, according to some implementations.

At step 402, a first circuitry of the device may receive a first input vector (e.g., the data input vector 221 (FIGS. 3A-3B)) for a write operation. In some implementations, the first circuitry may include a CAM (e.g., CAM array 202 of FIGS. 2 and 3A-3C). At step 404, the first circuitry may calculate a similarity between subsets of the first circuitry and the first input vector according to a first match criterion. In some implementations, the write operation of method 400 includes comparing the data input vector 221 with values of vectors (e.g., address identifiers) stored in the CAM array 202, selecting the CAM rows 212 based on a similarity between the data input vector 221 and the vectors stored in each CAM row 212.

At step 406, a second circuitry coupled to the first circuitry may output a first activation signal based on the first match criterion. At step 408, a third circuitry coupled to the second circuitry may receive the first activation signal and selectively activate one or more subsets of the third circuitry in response to the first activation signal. In some implementations, step 408 of selective activation includes incrementing or decrementing the values of the cells representing the counters of the activated subsets based on the first input vector. As an example, in step 408, the conductances in the DPE array 208 may be adjusted to store the data of the data input vector 221.

More specifically, during the input vector reception step 402 of method 400 (e.g., a writing method), a first circuitry may receive a first input vector for a write operation. The first input vector may contain data that is to be stored in the SDM 108 of the computing system 100. In response to receiving the first input vector, the first circuitry may perform the similarity calculation of step 404. At step 404, the CAM array 202 may calculate a similarity between subsets (e.g., rows) of the CAM array 202 and the first input vector according to a first match criterion. In some implementations, this similarity calculation may include determining Hamming distances between the first input vector and values of the data vectors (e.g., the address identifiers) stored within the CAM cells 210 of the CAM array 202. At step 404, outputs of the match lines ML of the CAM array 202 may be recorded in one cycle to obtain the Hamming distance.

At step 406, a second circuitry, which may be a sense amplifier 206, may output a first activation signal based on the first match criterion. In some implementations, the first activation signal may be generated in response to a similarity between the first input vector and the stored identifiers satisfying a predetermined threshold, indicating a sufficient level of similarity.

For example, the sense amplifier 206 may be configured to detect Hamming distances that are not greater than a given radius (e.g., the first threshold) by detecting a number of mismatches as described above with reference to FIGS. 2A-2B. The sense amplifier 206 may be configured to output first activation signals 240, 241 (FIG. 3A) in response to the Hamming distance being within a predetermined Hamming radius, indicating a sufficient level of similarity between the data input vector 221 and the random vectors stored in the CAM array 202.

The method then proceeds to step 408. At step 408, a third circuitry, which may be a DPE array 208, may receive the first activation signal. In some implementations, the DPE array 208 is coupled to the CAM array 202 such that each CAM row 212 has a corresponding row in the DPE array 208. In some implementations, the Hamming distances from the CAM array 202 are utilized by the sense amplifier 206 to selectively activate the corresponding rows of the DPE array 208, based on a first similarity threshold (or a first threshold), allowing the computing system 100 to perform associative memory functions of the SDM.

In some implementations, the sense amplifier 206 provides the first activation signals 240, 241 (FIG. 3A) to activate the corresponding DPE rows 226 of the DPE array 208. The DPE array 208 may represent multiple counters. The cells of the DPE representing the multiple counters may correspond to respective programmable elements 214 arranged in the DPE rows 226.

At step 408, the third circuitry (e.g., the DPE array 208) may selectively activate one or more subsets (e.g., rows) of the DPE array 208 in response to the first activation signal. In step 408, the conductances in the DPE array 208 may be adjusted to store the data of the data input vector 221.

For example, the activated CAM rows 212 may trigger activation of their respective rows in the DPE array 208. The selective activation may include incrementing or decrementing values of cells representing counters of the activated subsets (e.g., rows) based on the values of the first input vector and the registers in the first circuitry, such as the CAM array 202. The activation signals 240, 241 of the sense amplifier 206 may provide instructions to the DPE array 208 to increment or decrement values, e.g., the conductances, of the DPE cells during the write operation, based on the write input data provided by the data input vector 221. This selective activation may result in the adjustment of the programmable elements 214, which may be memristors, to store the data within the DPE array 208.

The DPE array 208 can store multiple copies of the data input vector based on the active set of locations obtained from the CAM array 202. The programmable elements 214 (e.g., memristors and or other types of programmable resistors) may facilitate the adjustment of conductances in the DPE array 208, which may allow multiple copies of the input data to be written into SDM, based on the active set of locations obtained from the CAM portion of the circuitry.

Figure 5:
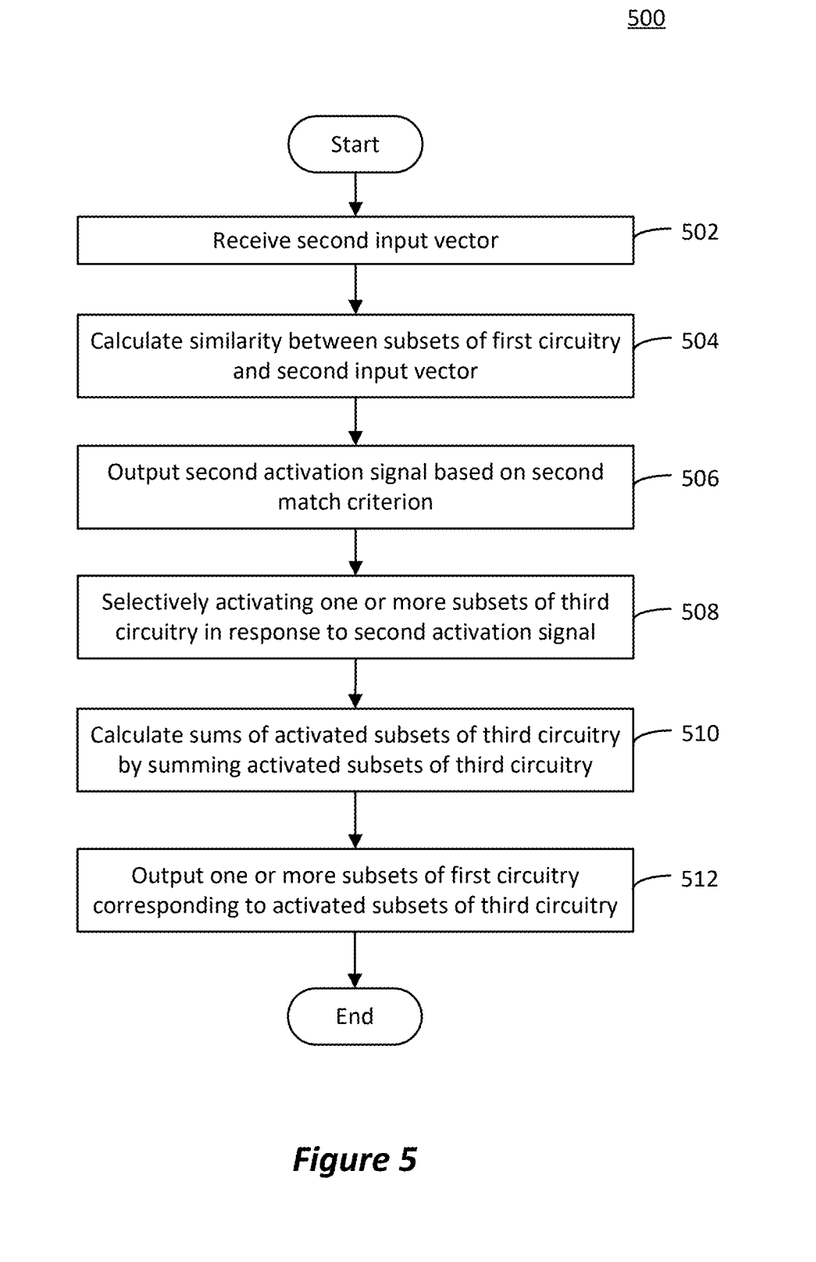
FIG. 5 illustrates an example method for implementing SDM, according to some implementations.

FIG. 5 illustrates an example method for implementing SDM, according to some implementations. For example, method 500 may correspond to reading data from a device, such as the computing system 100. More specifically, method 500 may provide a reading method using SDM 108, according to some implementations.

At step 502, a first circuitry, such as the CAM array 202, may receive a second input vector (e.g., the search vector 222 (FIG. 3C)). At step 504, the first circuitry may calculate a similarity between the subsets (e.g., rows) of the CAM array 202 and the second input vector according to a second match criterion. In some implementations, this calculation may include determining Hamming distances to identify the closest matches based on similarity. For example, at step 504, the computing system 100 may compare a second input vector (e.g., the search vector 222) with vectors stored in the CAM array 202, and may select the CAM rows 212 based on a similarity between the search vector 222 and the vectors stored in each CAM row 212. In some implementations, at step 504, the CAM rows 212 for which Hamming distances are within the Hamming radius of activation may be selected, and these selected CAM rows 212 may be set as active.

At step 506, second circuitry (e.g., the sense amplifier 206) may output a second activation signal based on the second match criterion (or the second threshold). In some implementations, at step 506, the second circuitry (e.g., the sense amplifier 206) may receive the second activation signal from the first circuitry (e.g., the CAM array 202). At step 506, the second circuitry (e.g., the sense amplifier 206) may output a second activation signal based on the second match criterion. For example, the second activation signal (e.g., the signals 247, 248) may be generated in response to a similarity between the second input vector, such as the search vector 222, and the stored identifiers (e.g., the identifiers stored in the CAM cells 210) meeting or exceeding the second threshold.

At step 508, in response to the second activation signal, one or more subsets of the third circuitry (e.g., the DPE array 208) may be selectively activated. At step 508, the third circuitry (e.g., the DPE array 208) may receive the second activation signal. For example, the cells of the DPE rows 226 that correspond to the selected CAM rows 212 may be activated in step 508.

At step 510, the third circuitry (e.g., the DPE array 208) may calculate sums of the activated subsets (e.g., the cells of the activated rows) of the DPE array 208 by summing the activated subsets along the columns of the DPE array 208. The sum calculation of step 510 may include calculating sums of the activated subsets of the third circuitry (e.g., cells of the activated rows in the DPE array 208) by summing the activated subsets (e.g., the cells representing the activated counters) along the columns of the third circuitry (e.g., the DPE array 208). The sums may have a third match criterion that may be used to determine the output of the device.

In some implementations, the activated cells in the DPE array 208 are summed along each DPE column 228. In some implementations, the output electrodes 216 connected to the programmable elements 214 of the DPE array 208 may output the sums of the activated rows of the DPE array 208. The output electrodes 216 may be connected to the processor 102, the interface 104, and/or the memory 106 of computer system 100 of FIG. 1 for providing the sums of the activated rows of the DPE array 208 to these components.

Continuing with method 500, at step 512, the third circuitry (e.g., the DPE array 208) may output at least one subset of the first circuitry (e.g., of the CAM array 202) corresponding to the activated subsets (e.g., the cells representing the counters of the activated rows) of the third circuitry. In some implementations, step 512 may include outputting one or more subsets of the first circuitry corresponding to the second selected subsets of the third circuitry, where outputting is based on the third match criterion and the column-wise sums of the activated subsets of the DPE array 208. The output may be facilitated by the output electrodes 216, which may provide the sums of the activated rows of the DPE array 208 to other components of the computing system 100 of FIG. 1, such as the processor 102 or the memory 106.

In some implementations, step 512 includes outputting at least one subset including at least one or more values stored in the plurality of cells of the first circuitry (e.g., the CAM cells 210) based on the third match criterion and the sums of the activated subsets of the third circuitry (e.g., the DPE array 208). As an example, the DPE array 208 may output at least one address identifier corresponding to the CAM row 212 based on the third threshold and the column-wise sums (e.g., the bitwise sums) of the activated DPE rows 226. For example, at step 512, the column-wise (or bitwise) sum can be compared to the third threshold to output the final data, e.g., the output vector 223 indicating the address of a corresponding CAM row 212 that has the closest similarity to the search vector 222. In some implementations, multiple output vectors 223 may be provided based on the second threshold of similarity between the search vector 222 and the addresses stored in the CAM rows 212, where such similarities meet the match criterion of the third threshold.

By following the method steps outlined in FIG. 5, the computing system 100 can identify the CAM rows 212 and the corresponding DPE rows 226 that are activated. In some implementations, the computing system 100 can output the locations in the CAM array 202 and/or DPE array 208 where the written input vector (e.g., the data input vector 221), which has a close similarity with the search vector 222, is stored in the CAM array 202 and/or DPE array 208.

In some implementations, the method outlined in FIG. 5 can include ranking of the activated CAM rows 212 based on the column-wise sums from the DPE array 208. The ranking algorithm can evaluate the column-wise sums in the DPE array 208 against the values in the activated cells of the DPE array 208. In some implementations, the ranking algorithm can assign a score or rank to each activated DPE row 226 (and the corresponding CAM row 212) based on the degree of similarity of the data input vector 221 to the search vector 222.

The method outlined in FIG. 5 can provide identifying and ranking the rows in the CAM array 202 and/or the DPE array 208 that are closely matching the search vector 222 (as reflected by the column-wise sums for the DPE array 208). In some implementations, identifying the rows in the CAM array 202 and/or the DPE array 208 that contain one or more addresses of the closely matching data input vector 221 provides efficient retrieval of relevant data and can be used to improve the performance of the computing system 100 utilizing the SDM 108.

As described above, FIGS. 4 and 5 illustrate example methods 400 and 500, respectively, for writing to (e.g., method 400) and reading from (e.g., method 500) a computer system 100, respectively, utilizing a CAM array 202, a sense amplifier 206, and a DPE array 208 to perform associative memory functions of the SDM within a computing system 100. Such writing and reading methods may provide efficient data storage and retrieval by leveraging the in-memory computing capabilities of the SDM 108.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. Steps can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A device, comprising:
a content addressable memory (CAM) comprising a plurality of CAM cells arranged in CAM-cell subsets that each comprise multiple CAM cells of the plurality of CAM cells, wherein the CAM is configured to:
calculate, for a write operation, first similarities between a first input vector and each of the CAM-cell subsets according to respective values stored in the CAM cells of each CAM-cell subset; and
calculate, for a read operation, second similarities between a second input vector and each of the CAM-cell subsets according to respective values stored in the CAM cells of each CAM-cell subset;
a sense amplifier coupled to the CAM and configured to:
output for the write operation a first activation signal based on the first similarities between the first input vector and each of the CAM-cell subsets; and
output for the read operation a second activation signal based on the second similarities between the second input vector and each of the CAM-cell subsets; and
a dot product engine (DPE) coupled to the sense amplifier and comprising a plurality of DPE cells arranged in DPE-cell subsets, the DPE configured to:
selectively activate for the write operation first selected DPE-cell subsets of the DPE-cell subsets according to the first activation signal from the sense amplifier;
decrement or increment values of DPE cells of the first selected DPE-cell subsets selectively-activated for the write operation;
selectively activate for the read operation second selected DPE-cell subsets of the DPE-cell subsets according to the second activation signal from the sense amplifier; and
calculate and output sums determined from the second selected DPE-cell subsets selectively-activated for the read operation.

2. The device of claim 1, wherein the device is configured to:
output one or more CAM-cell subsets corresponding to the second selected DPE-cell subsets selectively-activated for the read operation.

3. The device of claim 2, wherein the one or more output CAM-cell subsets indicate one or more locations in the CAM where the first input vector is stored.

4. A device, comprising:
first circuitry comprising a plurality of cells arranged in first subsets, each first subset comprising multiple cells of the plurality of cells of the first circuitry, wherein the first circuitry is configured to:
receive a first input vector for a write operation; and
calculate, according to a first match criterion, a similarity between the first subsets of the first circuitry and the first input vector;
second circuitry coupled to the first circuitry and configured to output a first activation signal based on the first match criterion; and
third circuitry coupled to the second circuitry and comprising cells arranged in second subsets, each cell of the third circuitry associated with a corresponding value, the third circuitry configured to:
receive the first activation signal; and
selectively activate one or more first selected subsets of the second subsets in response to the first activation signal by incrementing or decrementing the corresponding values of the cells of the one or more first selected subsets based on the first input vector.

5. The device of claim 4, wherein:
the first circuitry is further configured to:
receive a second input vector for a read operation; and
calculate, according to a second match criterion, a similarity between the first subsets of the first circuitry and the second input vector; and
the second circuitry is further configured to output a second activation signal based on the similarity calculated based on the second match criterion; and
the third circuitry is further configured to:
receive the second activation signal;
selectively activate one or more second selected subsets of the third circuitry in response to the second activation signal;

calculate sums of the one or more second selected subsets of the third circuitry by summing the one or more second selected subsets of the third circuitry; and output at least one output subset of one or more first subsets of the first circuitry corresponding to the second selected subsets of the third circuitry.

6. The device of claim 4, wherein the first circuitry is a content addressable memory (CAM).

7. The device of claim 4, wherein the third circuitry is a dot product engine (DPE) configured to store the first input vector based on the first activation signal.

8. The device of claim 4, wherein the first circuitry is configured to execute computation of Hamming distances to calculate a similarity between the first input vector and each first subset of the first circuitry.

9. The device of claim 4, wherein the third circuitry is configured to store two or more copies of the first input vector based on the first activation signal.

10. The device of claim 4, wherein at least one of the first subsets of the first circuitry or the second subsets of the third circuitry are arranged at least in one of rows or columns.

11. The device of claim 4, wherein the third circuitry is configured to increment or decrement the corresponding values of cells of the first selected subsets of the second subsets selectively activated for the write operation based on a plurality of binary values stored in the plurality of cells of the first circuitry.

12. The device of claim 5, wherein the device is configured to perform computing operations in memory to reduce data movement between data and storage units.

13. The device of claim 5, wherein the device is configured to operate with at least one of digital inputs or digital outputs without analog-to-digital conversions or digital-to-analog conversions.

14. The device of claim 5, wherein at least one first output subset of the third circuitry indicates at least one memory location of the first circuitry where the first input vector is stored.

15. The device of claim 5, wherein the third circuitry is further configured to output at least one first output subset comprising at least one or more values stored in cells of the plurality of cells of the first circuitry based on a match criterion and the sums determined from the second selected subsets of the third circuitry.

16. The device of claim 5, further comprising a fourth circuitry configured to output at least one first output subset comprising at least one or more values stored in cells of the plurality of cells of the first circuitry based on a match criterion and the sums determined from the second selected subsets of the third circuitry.

17. The device of claim 5, wherein the device is configured to perform calculation of sums along columns of the second selected subsets of the third circuitry.

18. The device of claim 8, wherein the first circuitry is configured to execute computation of Hamming distances in one cycle.

19. A method, comprising:
receiving, by a first circuitry of a device, a first input vector for a write operation, the first circuitry comprising a plurality of first subsets;
calculating, by the first circuitry, a similarity between the first input vector and the plurality of first subsets according to a first match criterion;
outputting, by a second circuitry coupled to the first circuitry, a first activation signal based on the first match criterion;
receiving, by a third circuitry coupled to the second circuitry, the first activation signal; and
selectively activating, by the third circuitry, one or more first selected subsets of second subsets of the third circuitry in response to the first activation signal, wherein the selective activation comprises incrementing or decrementing corresponding values of cells of the one or more first selected subsets based on the first input vector.

20. The method of claim 19, further comprising:
receiving, for a read operation, by a first circuitry comprising a plurality of subsets, a second input vector;
calculating, by the first circuitry, a similarity between the second input vector and first subsets of the plurality of subsets of the first circuitry, the similarity based on a second match criterion;
outputting, by a second circuitry, a second activation signal based on the second match criterion;
receiving, by a third circuitry, the second activation signal;
selectively activating, by the third circuitry, one or more second selected subsets of the third circuitry in response to the second activation signal;
calculating, by the third circuitry, sums of the one or more second selected subsets of the third circuitry by summing the one or more second selected subsets, the sums having a third match criterion; and
outputting, by the third circuitry, at least one output subset of one or more first subsets of the first circuitry corresponding to the second selected subsets of the third circuitry, wherein the at least one output subset indicates at least one memory location of the first circuitry where the first input vector is stored.

* * * * *